United States Patent
Nasim et al.

(10) Patent No.: US 12,026,520 B2
(45) Date of Patent: Jul. 2, 2024

(54) MULTIPLE MODULE BOOTUP OPERATION

(71) Applicant: ATI Technologies ULC, Markham (CA)

(72) Inventors: Kamraan Nasim, Markham (CA); Erez Koelewyn, Markham (CA)

(73) Assignee: ATI Technologies ULC, Markham (CA)

( * ) Notice: Subject to any disclaimer, the term of this patent is extended or adjusted under 35 U.S.C. 154(b) by 22 days.

(21) Appl. No.: 17/564,557

(22) Filed: Dec. 29, 2021

(65) Prior Publication Data

US 2023/0205547 A1    Jun. 29, 2023

(51) Int. Cl.
  *G06F 9/4401* (2018.01)
  *G06F 9/48* (2006.01)
  *G06F 9/54* (2006.01)

(52) U.S. Cl.
  CPC .......... *G06F 9/4406* (2013.01); *G06F 9/4843* (2013.01); *G06F 9/546* (2013.01); *G06F 2209/548* (2013.01)

(58) Field of Classification Search
  CPC ....... G06F 9/4406; G06F 9/4843; G06F 9/546
  USPC .......................................................... 713/2
  See application file for complete search history.

(56) References Cited

U.S. PATENT DOCUMENTS

| | | | | |
|---|---|---|---|---|
| 5,828,888 A | * | 10/1998 | Kozaki | G06F 9/4416 717/170 |
| 5,912,979 A | * | 6/1999 | Gavrilos | G07B 17/00661 382/101 |
| 6,189,100 B1 | * | 2/2001 | Barr | G06F 21/575 380/278 |
| 6,195,587 B1 | * | 2/2001 | Hruska | G06F 21/565 726/17 |
| 6,340,977 B1 | * | 1/2002 | Lui | G06F 9/453 715/709 |
| 7,296,143 B2 | | 11/2007 | Gaskins et al. | |
| 7,908,466 B2 | | 3/2011 | Oh et al. | |
| 9,009,457 B2 | | 4/2015 | O'Mullan et al. | |
| 10,649,790 B1 | * | 5/2020 | Ingegneri | G06F 9/4405 |
| 10,725,803 B1 | * | 7/2020 | Zhu | G06F 21/64 |
| 2002/0032769 A1 | * | 3/2002 | Barkai | H04L 41/046 705/28 |

(Continued)

*Primary Examiner* — Paul R. Myers
(74) *Attorney, Agent, or Firm* — Kowert, Hood, Munyon, Rankin & Goetzel, P.C.; Rory D. Rankin

(57) ABSTRACT

A system and method for efficiently measuring on-die power supply voltage are described. In various implementations, an integrated circuit includes at least one or more processors and on-chip memory. The on-chip memory has a higher security level than off-chip memory. One of the one or more processors is designated as a security processor. During the processing of the multiple boot steps of a bootup operation, the security processor initializes a message queue in on-chip memory. The security processor also loads multiple modules from off-chip memory into the on-chip memory. The processor executes the multiple loaded modules in an order based on using the message queue to implement inter-module communication among the plurality of boot modules. The security processor transfers requested data between modules using messages from the modules and data storage of the message queue. The modules are completed without reloading any modules from off-chip memory.

20 Claims, 7 Drawing Sheets

(56) References Cited

U.S. PATENT DOCUMENTS

| | | | | |
|---|---|---|---|---|
| 2002/0166061 A1* | 11/2002 | Falik | G06F 13/1605 | 711/E12.099 |
| 2004/0015709 A1* | 1/2004 | Chen | G06F 21/57 | 713/193 |
| 2007/0028244 A1* | 2/2007 | Landis | G06F 9/4555 | 718/108 |
| 2007/0288761 A1* | 12/2007 | Dale | G06F 21/575 | 713/189 |
| 2008/0176588 A1* | 7/2008 | Ashdown | H04W 4/14 | 455/466 |
| 2008/0295111 A1* | 11/2008 | Craft | G06F 11/1407 | 719/313 |
| 2009/0249055 A1* | 10/2009 | Itoh | G06F 9/4401 | 713/2 |
| 2009/0259854 A1* | 10/2009 | Cox | G06F 21/575 | 713/189 |
| 2009/0328195 A1* | 12/2009 | Smith | G06F 21/575 | 726/16 |
| 2010/0174696 A1* | 7/2010 | Dixon | G06F 9/4486 | 719/314 |
| 2015/0317495 A1* | 11/2015 | Rodgers | H04L 9/3247 | 713/192 |
| 2016/0300064 A1* | 10/2016 | Stewart | G06F 12/0638 | |
| 2016/0342439 A1* | 11/2016 | Woerndle | H04L 61/2596 | |
| 2019/0339888 A1* | 11/2019 | Sasidharan | G06F 3/0679 | |
| 2020/0073580 A1* | 3/2020 | Frolikov | G06F 9/4401 | |
| 2020/0394359 A1* | 12/2020 | Fitzgerald | G06F 40/151 | |
| 2021/0026971 A1* | 1/2021 | Hellwig | H04L 9/008 | |
| 2023/0195926 A1* | 6/2023 | Mehta | G06F 21/6245 | 726/1 |

\* cited by examiner

MULTIPLE MODULE BOOTUP OPERATION

BACKGROUND

Description of the Relevant Art

A reboot of a computing system occurs for one of a variety of reasons. For example, a system administrator or user requests a reboot, a failover process switches data storage controllers for managing a storage subsystem due to failure of the original data storage controller, a reboot automatically occurs during recovery from a power outage, and so on. The computing system has a dedicated processor that performs the boot steps of the bootup operation with each boot step using multiple boot actions. Each boot step includes multiple boot actions (firmware instructions) that are collected into a boot module. The bootup operation uses multiple boot modules. However, during the bootup operation, the computing system loads and executes less than a total number of boot modules at a time due to the limited data storage of the on-chip memory accessed by the dedicated processor. This modular boot flow is based on the premise of a plug-and-play architecture where modules can be loaded dynamically during the boot process. In certain cases, these modules are purpose-built and include particular functionality such as server reliability, availability, and serviceability (RAS) recovery. In some cases, this particular functionality is not required by one or more products. Therefore, the particular functionality is optionally loaded during a bootup operation if enabled in the BIOS (basic input basic output) configuration. In some designs, the computing system loads and executes a single boot module at a time.

Additionally, some of the boot modules request other boot modules to execute a particular sequence or function, which causes re-fetching of the boot modules and corresponding source data items into the on-chip memory. Each fetch of a boot module or a source data item includes the load operation of the fetch itself and an authentication operation. These repeated operations add to the latency of the bootup operation.

In view of the above, methods and systems for efficiently performing a bootup operation are desired.

Figure 1:
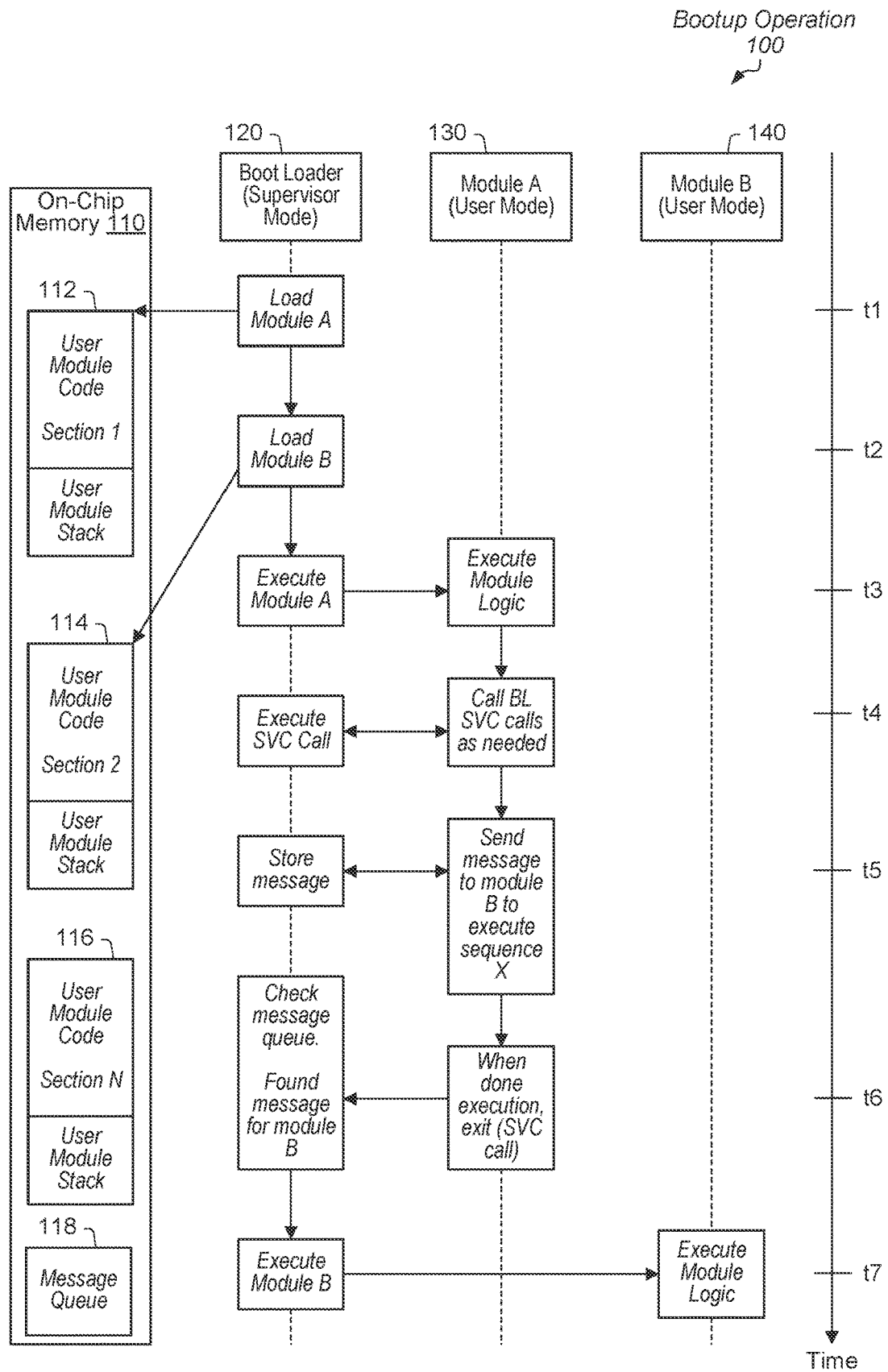
FIG. 1 is a generalized diagram of a bootup operation.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for efficiently performing a bootup operation are contemplated. In various implementations, a computing system includes an integrated circuit with one or more processors and on-chip memory. Examples of the on-chip memory in the integrated circuit are a variety of types of static random access memory (SRAM) used as a particular level of one or more levels of a cache memory subsystem. The on-chip memory has a higher security level than off-chip memory. One of the one or more processors is designated as a security processor for the computing system. One of the many activities that the security processor performs for the computing system is executing a bootup operation. During the processing of the multiple boot steps of the bootup operation defined in a boot loader, the security processor initializes, or allocates, a message queue in on-chip memory. The security processor also initializes multiple regions of the on-chip memory with each region corresponding to a single boot module. The security processor provides security for these regions by preventing read and write access to each memory region from any boot module other than an assigned boot module. In an implementation, the security processor executes the boot loader in supervisor mode, and the security processor while operating in supervisor mode has access to the entirety of the on-chip memory. The security processor executes the boot modules in user mode, and the security processor in user mode has access to only a region of the on-chip memory corresponding to a currently executing boot module.

The security processor additionally loads the multiple boot modules from off-chip memory into the regions of the on-chip memory. Examples of the off-chip memory are one of a variety of types of read only memory (ROM) such as Flash EEPROM (electrically erasable programmable read-only memory), SPI (serial peripheral interface) based ROM, and so on. The multiple boot modules (or modules) being loaded are a subset of the total number of modules of the entire bootup operation. The security processor selects which modules to load based on the predefined steps of the boot loader. The security processor also loads source data corresponding to the multiple selected boot modules that are loaded. The security processor authenticates each module and corresponding source data when loading them from off-chip memory for storage in the on-chip memory.

In various implementations, the security processor performs the above steps and executes the multiple loaded modules in an order based on using the message queue to implement inter-module communication among the plurality of boot modules. For example, the security processor executes the modules based on the predefined steps of the boot loader. In some implementations, a transfer of control occurs between the security processor operating in supervisor mode and the security processor operating in user mode while the modules of the bootup operation are processed. As described earlier, in an implementation, the security processor executes the boot loader in supervisor mode, but executes the boot modules in user mode. In an implementation, direct access of the security processor is prevented, and communication with the security processor includes using an inbox and an outbox of a mailbox messaging mechanism. This mailbox messaging mechanism is a separate, different mechanism than the accesses of the message queue during inter-module communication. However, when a first module requests data that has not yet been generated by a second module, the bootup operation allows the first module to generate a message that identifies both the requested data and the second module that can generate the requested data.

In some implementations, the generated message also includes state information that indicates in what manner the second module is executed. For example, the code of the second module includes a case statement or an IF-THEN-ELSE construct, and a particular path taken in the second module is based on the state information in the message. While executing the first module, the security processor sends the message to the message queue for data storage. Upon completion of the first module, the security processor, while executing the boot loader, checks the message queue, finds the message from the first module, and executes the second module based on any state information in the message. At a later time, the security processor executes again the first module and uses the requested data. The modules are completed without reloading any of the modules from off-chip memory. Additionally, the modules are completed without reloading any source data from off-chip memory. By loading the modules and the source data a single time from off-chip memory during the bootup operations, the latency of the bootup operation reduces.

Turning now to FIG. 1, a generalized diagram is shown of a bootup operation 100. As shown, three execution flows are shown for a boot loader 120, a boot module A (or module 130), and a boot module B (or module 140). The on-chip memory 110 stores multiple module regions 112-116 (or regions 112-116) and memory queue 118. In various implementations, a computing system includes an integrated circuit with multiple processors and on-chip memory 110, and the integrated circuit communicates with a variety of types of off-chip computing resources. The multiple processors and other hardware resources of the computing system are not shown in FIG. 1 for ease of illustration. An example of such a computing system, though, is provided in computing system 400 of FIG. 4. The on-chip memory 110 has a higher security level than off-chip memory. Examples of the on-chip memory in the integrated circuit are a variety of types of static random access memory (SRAM) used as a particular level of one or more levels of a cache memory subsystem. Examples of the off-chip memory are one or more of a variety of types of read only memory (ROM) such as Flash EEPROM (electrically erasable programmable read-only memory), SPI (serial peripheral interface) based ROM, other types of boot flash chip, a secure digital (SD) card, and so on.

One of the multiple processors (not shown) is designated as a security processor for the computing system. Alternatively, a coprocessor or other component within one of the processors is used as the dedicated security processor. One of the many activities that the security processor performs for the computing system is executing a bootup operation. In an implementation, the security processor executes the boot loader 120 in supervisor mode, but executes boot modules, such as the boot modules 130 and 140, in user mode. The security processor begins the bootup operation for one of a variety of reasons. For example, a system administrator or user requests a reboot, a failover process switches data storage controllers for managing a storage subsystem due to failure of the original data storage controller, a reboot automatically occurs during recovery from a power outage, and so on.

The security processor identifies and tests hardware components corresponding to a hardware configuration of the computing system. Afterward, the security processor searches for a first-level boot loader, finds it, and loads it. While executing the first-level boot loader, the hardware, such as circuitry, of the security processor identifies and loads a second-level boot loader. By finding, loading, and executing the second-level boot loader, the hardware of the security processor transitions execution to the second-level boot loader. In some implementations, the boot loader 120 is the second-level boot loader. In other implementations, the boot loader 120 is another level boot loader used during the bootup operation.

In an implementation, the hardware, such as circuitry, of the security processor executes the boot loader 120 in a supervisor mode, whereas, the hardware of the security processor executes, in user mode, the multiple modules of the bootup operation based on the predefined steps of the boot loader 120. Therefore, in some various implementations, a transfer of control occurs between supervisor mode and user mode of the computing system while the modules of the bootup operation are processed. In an implementation, direct access of the security processor is prevented, and communication between the security processor and other processors includes using an inbox and an outbox of a mailbox messaging mechanism. This mailbox messaging mechanism is a separate, different mechanism than the accesses of the message queue 118 during inter-module communication.

When the security processor has reached a level of the bootup operation that includes the boot loader 120, the security processor processes multiple boot steps defined in the boot loader 120 such as initializing the multiple module regions 112-116 in the on-chip memory 110. In other words, the security processor allocates the regions 112-116 in the on-chip memory 110. In an implementation, each of the regions 112-116 correspond to a single module. In various implementations, the size of a given one of the regions 112-116 is dependent upon the corresponding module. In other implementations, each of the sizes of the regions 112-116 is a same predetermined amount of data storage. As shown, each of the regions 112-116 stores at least code of a corresponding module. In addition, source data, intermediate data, and result data are stored in a stack.

In some implementations, the size of the memory queue 118 is dependent upon the number of modules being loaded and executed in a particular phase of execution of the bootup operation. In one example, the boot loader 120 of the bootup operation uses 20 modules with a first phase using 4 modules that include at least modules 130 and 140. A second phase possibly uses 2 modules that are sequentially loaded and executed after modules 130 and 140, and so on. In another implementation, the size of the memory queue 118 is a same predetermined amount of data storage in the on-chip memory for each of the phases of execution of the bootup operation. In an implementation, while the security processor executes the boot loader 120 in supervisor mode, the security processor has access to the entirety of the on-chip memory 110. However, while the security processor executes the module 130 in user mode, the security processor has access to only region 112. Similarly, while the security processor executes the module 140 in user mode, the security processor has access to only region 114.

Although two modules 130 and 140 are shown, in other implementations, another number of modules are loaded for execution. The security processor typically loads modules 130 and 140 from off-chip read only memory (ROM), which has significant access latency. In some examples, the latency of accessing off-chip memory includes traversing an SoC external SPI interface or an external I2C interface that supports the I2C (Inter-Integrated Circuit) communication protocol. The security processor also loads source data corresponding to the modules 130 and 140 into the regions 112 and 114. Additionally, the security processor authenticates the modules 130 and 140 and the corresponding source data when they are loaded from the off-chip ROM into the on-chip memory 110. This authentication step for each module further increases the latency of the bootup operation. Loading one or more modules multiple times, authenticating these one or more modules multiple times, and loading source data corresponding to these one or more modules multiple times increases the latency of the bootup operation. By using the steps described in the following discussion, the computing system reduces the latency of the bootup operation by loading each module and corresponding source data only a single time.

A timeline is shown on the right of the diagram. As shown, at the point in time t1 (or time t1), while executing the boot loader 120 in supervisor mode, the security processor loads the code and source data of module 130 (Module A) into region 112 of the on-chip memory 110. At time t2, the security processor loads the code and source data of module 140 (Module B) into region 114 of the on-chip memory 110. Based on the predefined steps of the boot loader 120, the security processor begins executing the module 130 at time t3. In various implementations, the hardware, such as circuitry, of the security processor executes the code of the module 130 in user mode. At time t4, the security processor executes boot loader service calls (BL SVC calls) as needed.

At time t5, when the module 130 requests data that has not yet been generated by module 140, the security processor generates a message while executing the module 130 that identifies both the requested data and the module 140 that can generate the requested data. In some implementations, the generated message also includes state information that indicates in what manner the module 140 is executed. For example, the code of the module 140 includes a case statement or an IF-THEN-ELSE construct, and a particular path taken in the module 140 is based on the state information in the message. For example, the message includes state information that identifies a control path in module 140 that includes "sequence X." While executing the module 130, the security processor sends the message for storage in the message queue 118. In an implementation, the security processor authenticates the message before storing the message in the message queue 118 of the on-chip memory 110.

The other processor continues to execute the instructions of the module 130 until the module 130 completes at time t6. In various implementations, while executing the boot loader 120, the security processor checks the message queue 118 upon completion of any module of the bootup operation. If the security processor determines that there is no message stored in the message queue 118, then the security processor selects a next module to execute based on a sequential sequence defined by the boot loader 120 of the bootup operation. However, at time t6, the security processor finds the message from module 130 stored in the message queue 118. The security processor selects this message. In various implementations, the security processor manages the message queue 118 as a first-in-first-out (FIFO) buffer in the on-chip memory 110. Therefore, when the message queue 118 stores multiple messages, the security processor selects the oldest message first for processing.

The message includes information such as an identifier of the module 140 that can generate the requested data, and state information that indicates in what manner the module 140 is executed. As described earlier, the state information determines which control flow paths are taken in the module 140. Using the information stored in the selected message, the security processor, at time t7, executes the module 140. The bootup operation continues as described in the following discussion regarding bootup operation 200 (of FIG. 2) and bootup operation 300 (of FIG. 3).

Figure 2:
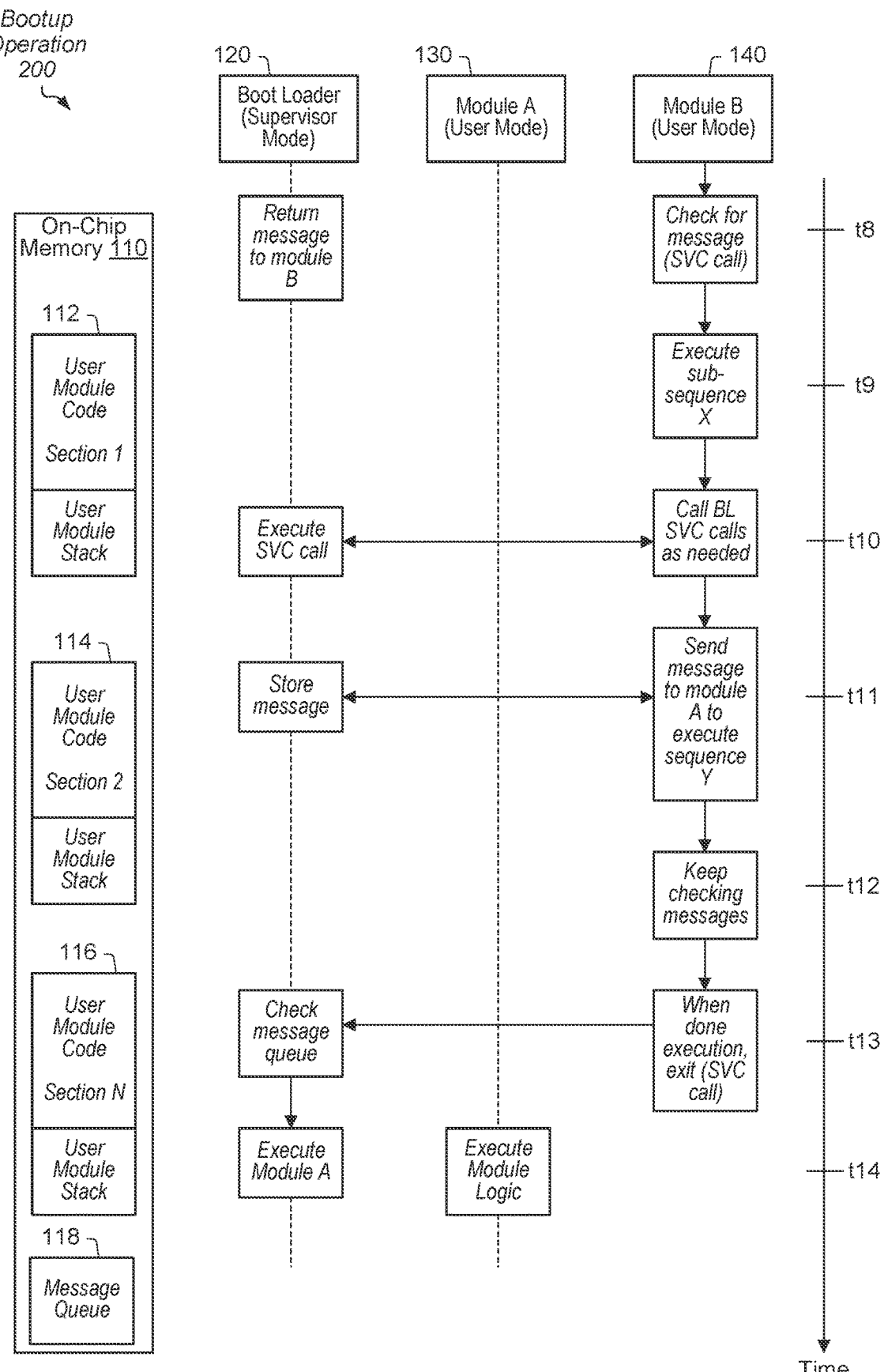
FIG. 2 is a generalized diagram of a bootup operation.

Referring to FIG. 2, a generalized diagram is shown of a bootup operation 200. Circuitry and logic previously described are numbered identically. The bootup operation 200 continues the steps begun in the bootup operation 100 (of FIG. 1). For example, the timeline on the right continues from the points in time shown earlier in the bootup operation 100. At time t8, the security processor, which is executing the module 140 in user mode, executes a service call (SVC call) that requests the boot loader 120 to provide any messages. The security processor, while executing the boot loader 120 in supervisor mode, retrieves the message from the message queue 118 and returns it to the module 140.

In some implementations, the module 140 includes a sequence of instructions before branching to different control flow paths. Therefore, the module 140 does not yet need state information from the message. When the module 140 reaches a divergent point in its control flow, the module 140 being aware of the message, requests that the message be sent. In other implementations, the security processor receives the message along with the code of the module 140 such that the message is present upon beginning the execution of the module 140. In yet other implementations, the code of the module 140 begins with checking for any messages targeting the module 140. Other mechanisms for transferring state information and any other information from the message to the module 140 are also possible and contemplated.

At time t9, the security processor executes the code of the "sequence X" (shown in FIG. 2 as "sub-sequence X") based on the state information in the message. For example, the security processor selects a particular control flow path in the code of the module 140 based on the state information. The selected control flow path is included in a case statement, an IF-THEN-ELSE construct, or other. In various implementations, the security processor, while executing in supervisor mode, authenticates the result data and then stores it in the stack section of region 112 so that use of the result data by the module 130 can occur later. At time t10, the security processor executes boot loader service calls (BL SVC calls) as needed.

At time t11, when the module 140 requests data that has not yet been generated by module 130, the security processor generates a message while executing the module 140 that identifies both the requested data and the module 130 that can generate the requested data. These steps are similar to the steps performed at time t5. The generated message includes state information that identifies a control path in module 130 that includes "sequence Y." While being executed in user mode by the security processor, the module 140 sends the message to the boot loader 120 for storage in the message queue 118 by the security processor operating in supervisor mode. In an implementation, the security processor authenticates the message before storing the message in the message queue 118 of the on-chip memory 110.

The security processor, in user mode, continues to execute the instructions of the module 140, and continues checking for messages at time t12. If there are other messages, then the security processor executes them using the code of the module 140 and the state information in the messages. The security processor continues to execute the instructions of the module 140 until the module 140 completes at time t13. In various implementations, as described earlier, while executing the boot loader 120, the security processor checks the message queue 118 upon completion of any module of the bootup operation. At time t14, the same type of steps described earlier at time t7 are performed. Here, though, the module 130 is selected again for execution. It is noted that the code of the module 130 is retrieved from region 112, rather than loaded from off-chip memory such as a flash chip or other type of ROM. The bootup operation continues as described in the following discussion regarding bootup operation 300 (of FIG. 3).

Figure 3:
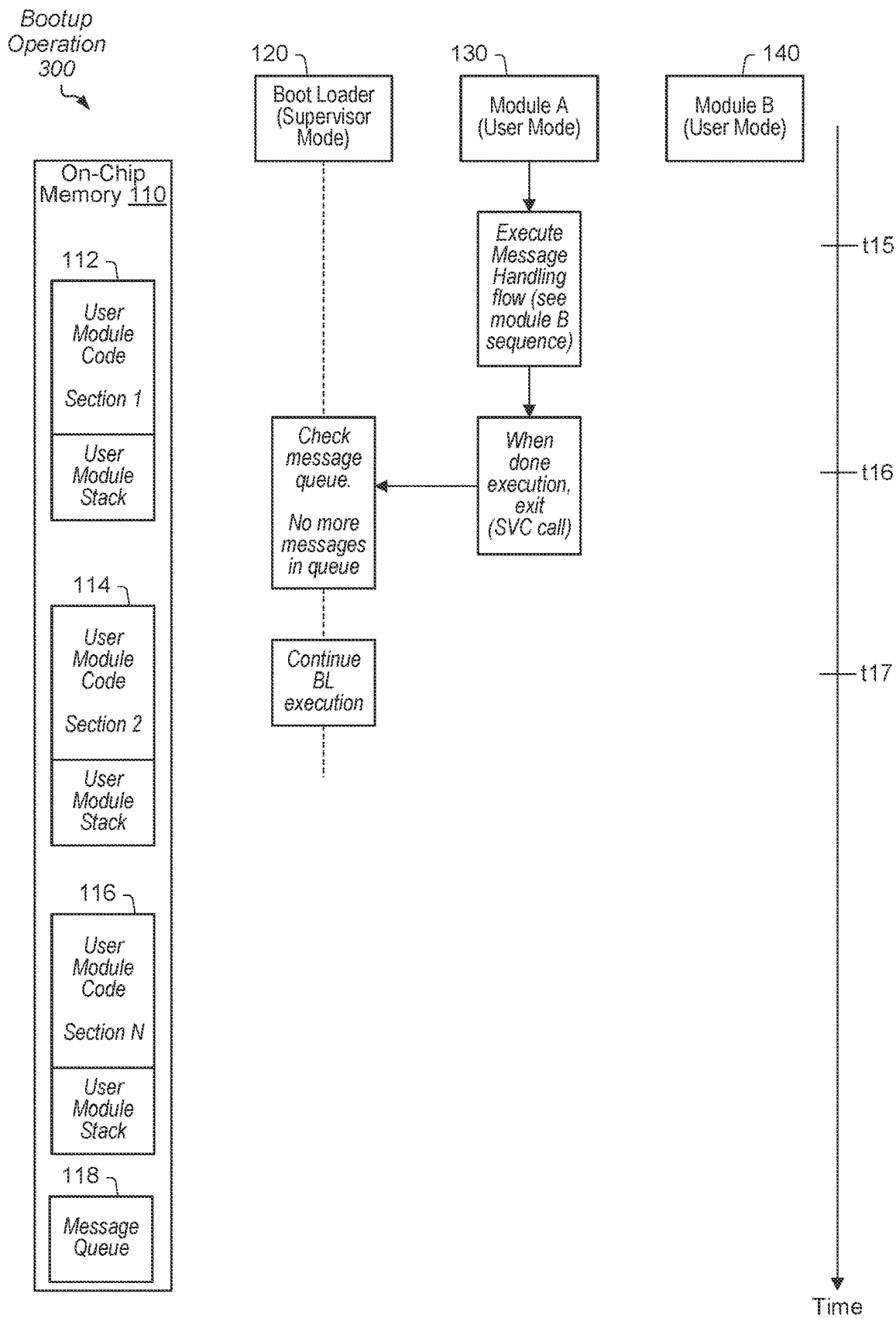
FIG. 3 is a generalized diagram of a bootup operation.

Turning now to FIG. 3, a generalized diagram is shown of a bootup operation 300. Circuitry and logic previously described are numbered identically. The bootup operation 300 continues the steps begun in the bootup operation 200 (of FIG. 2). For example, the timeline on the right continues from the points in time shown earlier in the bootup operation 200. At time t15, the same type of steps described earlier from time t8 to time t12 are performed. The security processor continues to execute the instructions of the module 130 until the module 130 completes at time t16. In various implementations, as described earlier, while executing the boot loader 120, the security processor checks the message queue 118 upon completion of any module of the bootup operation.

At time t16, the security processor determines the message queue 118 is empty. Therefore, at time 17, the security processor continues execution of the boot loader 120. For example, while executing the boot loader 120, the security processor selects a next module in the predefined sequence of the boot loader 120. If the next module is not present in the regions 112-116, then the security processor initializes regions for a next phase of the bootup operation, and repeats the steps described earlier from time t1 to time t17. This type of iterative processing occurs until the bootup operation completes. At such a point, the security processor transfers control to a secure operating system.

Figure 4:
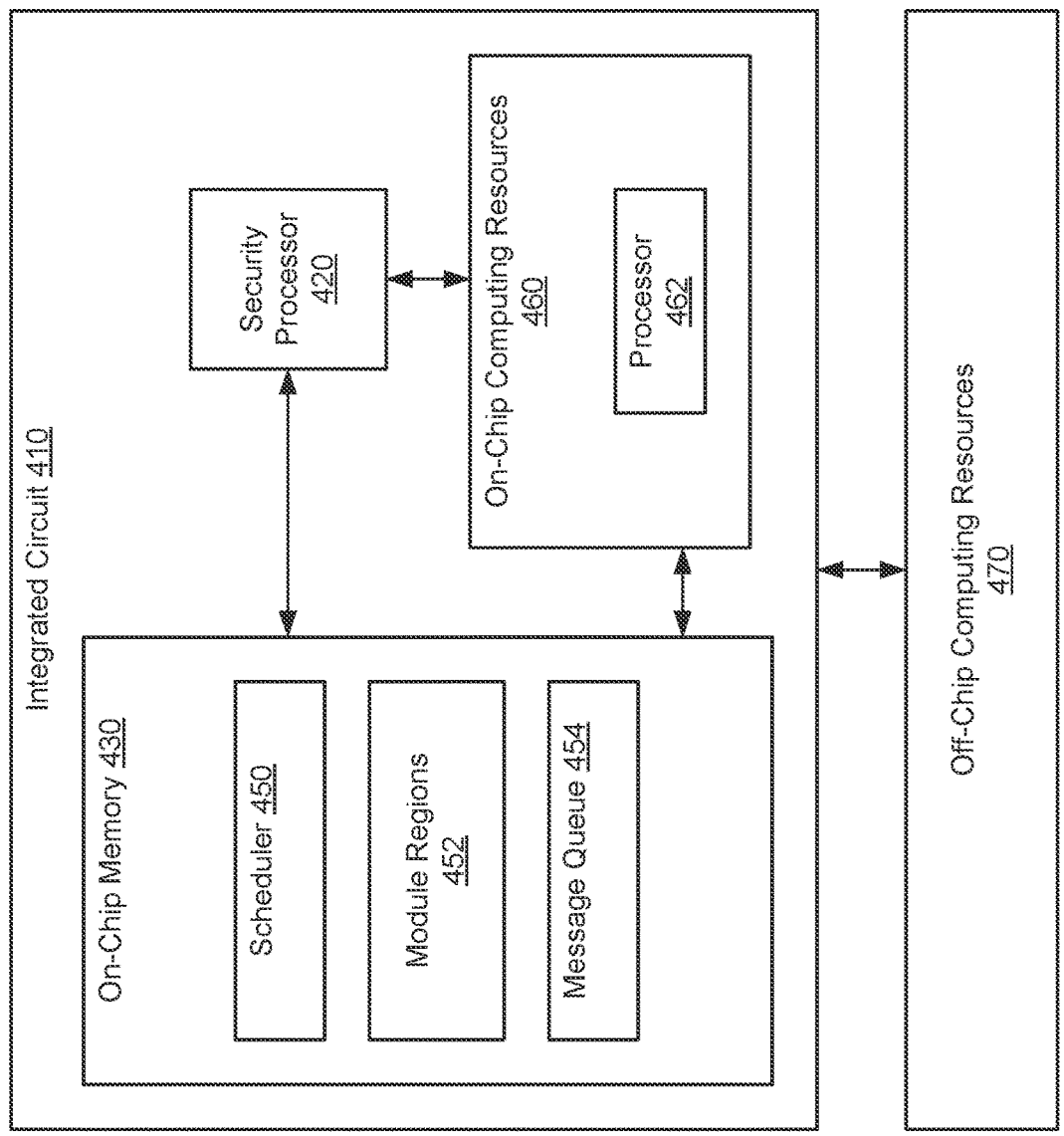
FIG. 4 is a generalized diagram of a computing system.

Turning now to FIG. 4, a generalized diagram is shown of a computing system 400. As shown, the computing system 400 includes an integrated circuit 410 and off-chip computing resources 470 that are located externally from the integrated circuit 410. The integrated circuit 410 includes on-chip memory 430, a security processor 420, and other on-chip computing resources 460. Examples of the integrated circuit 410 are a system on a chip (SoC), an accelerated processing unit (APU) that includes a central processing unit (CPU) and a graphics processing unit (GPU), one of a variety of types of an application specific integrated circuit (ASIC), a digital signal processor (DSP), or other. In some implementations, the functionality of the computing system 400 is incorporated on a system on chip (SoC). In other implementations, the functionality of the computing system 400 is incorporated on a peripheral card inserted in a motherboard. Although a single integrated circuit 410 is shown, the computing system 400 uses another number of integrated circuits in other implementations. The computing system 400 is used in any of a variety of computing devices such as a server used to provide critical applications and services, a desktop computer, a laptop, a tablet, a smartphone, a game console, or other similar computing devices that would benefit from a reduced latency boot-up operation.

Each of the on-chip computing resources 460, such as process 462, and the off-chip computing resources 470 include a variety of components that provide particular functionality in the computing system 400. These components are not shown for ease of illustration. Examples of these components are a power manager, a communication fabric and/or system buses, a memory controller, a network interface unit, an input/output interface unit for communicating with external peripheral devices, one or more phased locked loops (PLLs) and other clock generation circuitry, temperature sensors and current sensors, and so forth.

In various implementations, the off-chip computing resources 470 also include off-chip memory. In some implementations, the off-chip memory includes one or more of a variety of types of read only memory (ROM) such as Flash EEPROM (electrically erasable programmable read-only memory), SPI (serial peripheral interface) based ROM, other types of boot flash chip, a secure digital (SD) card, and so on. In other implementations, the off-chip memory also includes variety of types of dynamic random access memory (DRAM), disk memory such as hard disk drives (HDDs) or solid-state disks (SSDs), and remote memory located across a network. The remote memory can include DRAM or a disk drive (e.g., a HDD or a SSD) within a server used for Cloud-based storage.

Although a single on-chip memory 430 is shown, in various implementations, the integrated circuit 410 includes multiple on-chip memories. An example of the on-chip memories in the integrated circuit 410 are a variety of types of static random access memory (SRAM) used as one or more levels of a cache memory subsystem. In various implementations, the security processor 420, the on-chip memory 430, and protected security firmware form a security subsystem for the integrated circuit 410. The protected firmware is stored in one of the security processor 420 and the on-chip memory 430 and executed by the security processor 420. This security subsystem provides a software and hardware root-of-trust to help secure the processing and storage of trusted applications and corresponding sensitive data. The security subsystem manages the bootup operation, monitors activities of the integrated circuit 410 for suspicious actions, and performs security related operations such as performing encryption and cryptographic functions.

In some implementations, the security processor 420 is a dedicated processor, coprocessor or microcontroller used within the security subsystem, but not used for other functions. For example, the security processor 420 performs services independently from applications executed by a CPU, a GPU, a multimedia engine and other types of processing units in the integrated circuit 410. In other implementations, the security processor 420 is a coprocessor or microcontroller within a CPU, a GPU or other processing unit of the integrated circuit 410. In yet other implementations, the security processor 420 is one or more dedicated processor cores of a CPU, one or more dedicated compute units of a GPU, or other dedicated hardware within a processing unit of the integrated circuit 410. For example, the security processor 420 is one or more dedicated processor cores within the processor 462 when the processor 462 represents a CPU. Alternatively, the security processor 420 is a one or more dedicated compute units within the processor 462 when the processor 462 represents a GPU. In an implementation, direct access of the security processor 420 is prevented, and communication with the security processor 420 includes using an inbox and an outbox messaging mechanism. This mailbox messaging mechanism is a separate, different mechanism than the accesses of the message queue that stores messages 454 during inter-module communication.

A reboot of the computing system 400 occurs for one of a variety of reasons. For example, a system administrator or user requests a reboot, a failover process switches data storage controllers for managing a storage subsystem due to failure of the original data storage controller, a reboot automatically occurs during recovery from a power outage, and so on. Responsive to a power-on or other reboot signal, the security processor 420 executes basic input output (BIOS) firmware and accesses a hardware configuration of the computing system 400 and tests one or more hardware components during a power-on self-test (POST). The hardware configuration of the computing system 400 includes at least a processor architecture, the input/output (I/O) ports for connected peripheral devices and storage devices, an amount of on-die memory, such as a variety of types of RAM, and an amount of off-chip memory, power management features, and so forth. Alternatively, firmware using Unified Extensible Firmware Interface (UEFI) standard is used over BIOS.

After successful testing of the hardware, the security processor 420, while executing firmware, traverses a list of storage devices in a particular order to search for a first-level boot loader (BL). The security processor 420 loads the first-level bootloader into random access memory (RAM) on the integrated circuit 410. In some implementations, the integrated circuit 410 includes both a CPU and a GPU such as when the integrated circuit 410 is implemented as an APU or a SoC. Therefore, the bootup operation operates on each of the CPU and the GPU of the integrated circuit 410 concurrently and there are synchronization points where the CPU and the GPU communicate with each other during the bootup operation.

While the hardware, such as circuitry, of the security processor 420 executes the first-level boot loader, the hardware of the security processor 420 finds and loads a subsequent second-level bootloader. The security processor 420 executes the second-level bootloader. By finding, loading, and executing the second-level boot loader, the hardware of the security processor 420 transitions execution to the second-level boot loader. In other implementations, another particular boot loader is used other than the second-level boot loader to begin execution of a main execution thread of the bootup operation. When executing the main execution thread of the bootup operation, in various implementations, the security processor 420 executes the scheduler 450 to manage the execution of the multiple modules of the bootup operation.

In some implementations, the scheduler 450 is a single-threaded, relatively simple operating system scheduler used only during the bootup operation. During the processing of the multiple boot steps of the bootup operation defined in a boot loader, the security processor 420 initializes, or allocates, multiple module regions 452 (or regions 452) in the on-chip memory 430. The security processor 420 also allocates the memory queue 454. In various implementations, the type of data storage and the functionality of the module regions 452 are equivalent to the regions 112-116 (of FIG. 1). Similarly, the type of data storage and the functionality of the memory queue 454 is equivalent to the memory queue 118 (of FIG. 1).

In an implementation, the security processor 420 executes the scheduler 450 in a supervisor mode. The security processor 420 executes, in user mode, the multiple modules of the bootup operation stored in the module regions 452. Therefore, in some various implementations, a transfer of control occurs between the security processor's higher privilege supervisor mode and its lower privilege user mode of the computing system 400 while the modules in the regions 452 are processed. The scheduler 450 manages the execution of modules of the bootup operation that include boot actions such as initializing a frame buffer implemented as DRAM storage for the GPU, implementing communication protocols between processing units, and other steps of a secure boot process such as an SoC secure boot process. In various implementations, the integrated circuit 410 performs the bootup operation using steps described earlier regarding the bootup operations 100-300 (of FIGS. 1-3).

Figure 5:
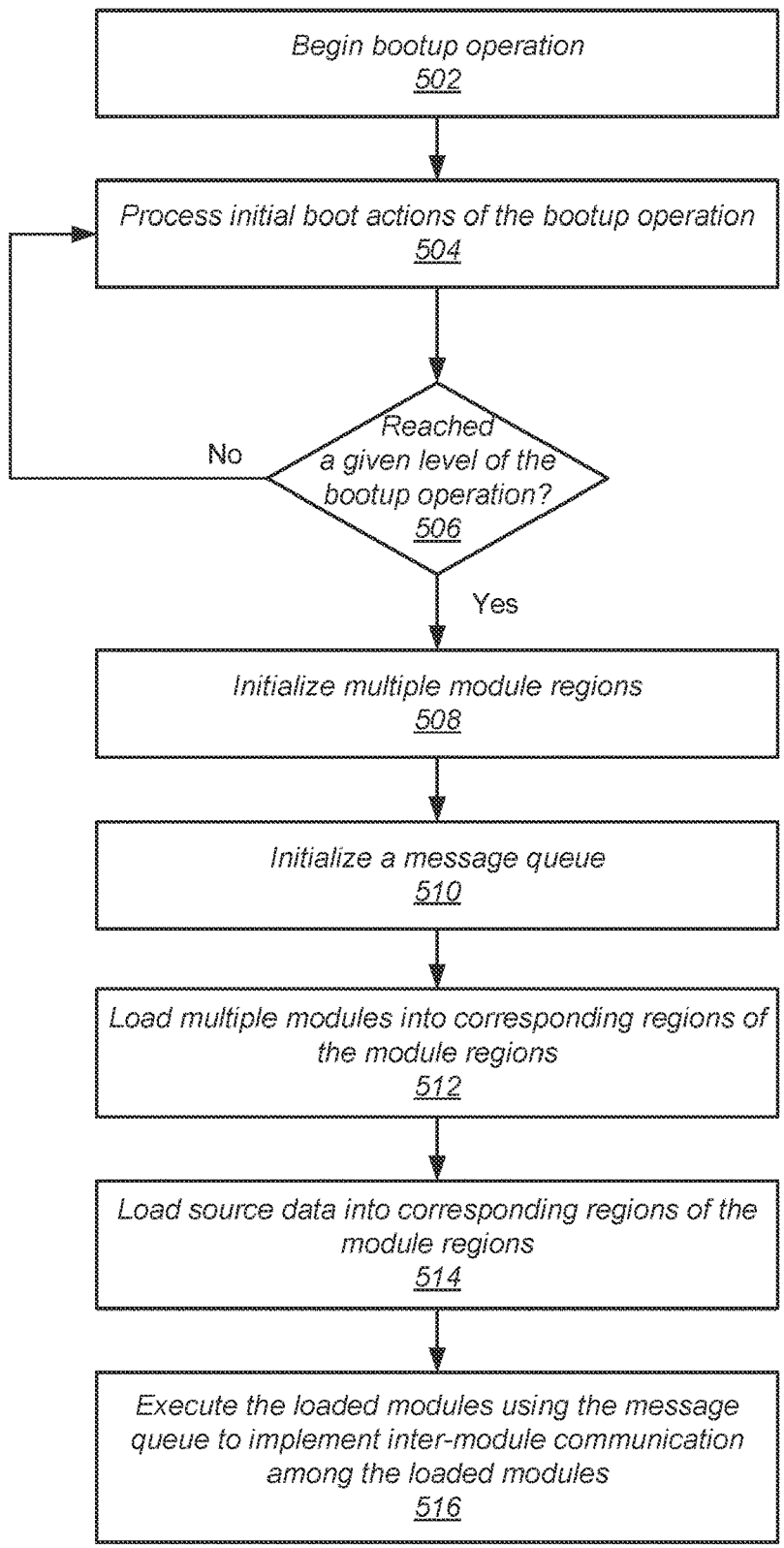
FIG. 5 is a generalized diagram of a method for efficiently performing a bootup operation.

Referring now to FIG. 5, a generalized diagram is shown of a method 500 for efficiently performing a bootup operation. For purposes of discussion, the steps in this implementation are shown in sequential order. However, in other implementations some steps occur in a different order than shown, some steps are performed concurrently, some steps are combined with other steps, and some steps are absent.

In various implementations, a computing system includes at least an integrated circuit with one or more processors and on-chip memory. The on-chip memory has a higher security level than off-chip memory. Examples of the on-chip memory in the integrated circuit are a variety of types of SRAM used as a particular level of one or more levels of a cache memory subsystem. Examples of the off-chip memory are one of a variety of types of ROM. One of the one or more processors is designated as a security processor for the computing system. Alternatively, a coprocessor or other component within one of the processors is used as the dedicated security processor. One of the many activities that the security processor performs for the computing system is executing a bootup operation. The security processor begins a bootup operation (block 502). The security processor begins the bootup operation for one of a variety of reasons. For example, a system administrator or user requests a reboot, a failover process switches data storage controllers for managing a storage subsystem due to failure of the original data storage controller, a reboot automatically occurs during recovery from a power outage, and so on.

The security processor processes the initial boot actions of the bootup operation (block 504). For example, the security processor identifies and tests hardware components corresponding to a hardware configuration of the computing system. Afterward, the processor searches for a first-level boot loader, finds it, and loads it. While executing the first-level boot loader, and loads the second-level boot loader. In an implementation, when the security processor loads the second-level boot loader, the security processor has reached a given level of the bootup operation. If the security processor has not yet reached a given level of the bootup operation ("no" branch of the conditional block 506), then control flow of method 500 returns to block 504 where the security processor processes the initial boot actions of the bootup operation.

If the security processor has reached the given level of the bootup operation ("yes" branch of the conditional block 506), then the security processor processes multiple boot steps defined in the second-level boot loader such as initializing multiple module regions in the on-chip memory (block 508). In other words, the security processor allocates multiple memory regions in the on-chip memory. In an implementation, each of the multiple regions correspond to a single module. In various implementations, the sizes of the memory regions are dependent upon the corresponding module. In other implementations, each of the sizes of the memory regions is a same predetermined amount of data storage.

The security processor provides security for the initialized regions by preventing read and write access to each memory region from any module other than an assigned module. For example, in various implementations, the security processor executes the boot loader in supervisor mode, and while operating in supervisor mode, the security processor has access to the entirety of the on-chip memory. However, the security processor also executes the boot modules in user mode, and the security processor in user mode has access to only a region of the on-chip memory corresponding to a currently executing boot module. Therefore, in various implementations, a transfer of control occurs between supervisor mode and user mode of the computing system while the modules of the bootup operation are processed.

In an implementation, the number of the multiple regions is equal to the number of modules being loaded for processing in a particular stage or phase of the bootup operation. In one example, the second-level boot loader of the bootup operation uses 20 modules with a first phase using the first 3 modules, a second phase using the next 2 modules, a third phase using the next 4 modules, a fourth phase using the next 3 modules, a fifth phase using the next 3 modules, a sixth phase using the next 2 modules, and a final seventh phase using the remaining 3 modules. Therefore, during the first phase, the security processor initializes 3 memory regions for the first 3 modules. The security processor assigns a first memory region to a first module of the 3 modules. The security processor also prevents read and write access to the first memory region from any of the unassigned modules such as the second and third modules of the first 3 modules. The controlled access is performed in a similar manner for the second memory region and the third memory region as well as for memory regions used in later phases.

The security processor also initializes, or allocates, a message queue in the on-chip memory (block 510). In some implementations, the size of the memory queue is dependent upon the number of modules being used in a particular phase of execution of the bootup operation. In another implementation, the size of the memory queue is a same predetermined amount of data storage in the on-chip memory for each of the phases of execution of the bootup operation. The security processor loads multiple modules into the corresponding regions of the multiple module regions (block 512). For example, the security processor loads each of the multiple modules from off-chip memory such as a ROM used to store firmware instructions. The security processor also authenticates the multiple modules before storing them in corresponding regions of the multiple regions of the on-chip memory.

The security processor also loads source data into corresponding regions of the module regions (block 514). The security processor also authenticates the multiple modules before storing them in corresponding regions of the multiple regions of the on-chip memory. The security processor executes the loaded modules using the message queue to implement inter-module communication among the loaded modules (block 516). The security processor executes the multiple loaded modules in an order initially based on the predefined steps of the boot loader. However, during the processing of the boot modules when the message queue is occupied (not empty), the security processor executes the multiple loaded modules in an order based on the messages stored in the message queue, which implements inter-module communication among the multiple boot modules. Examples of the inter-module communication among the multiple boot modules is provided in the bootup operations 100, 200 and 300 (of FIGS. 1-3).

The security processor transfers requested data between the multiple loaded modules using messages from the modules and data storage of the message queue. Although the security processor generates the message while executing a particular module, the security processor performs the steps of authentication as well as the read accesses and the write accesses of the message queue in the on-chip memory. The modules are completed without reloading any of the modules from off-chip memory. Additionally, the modules are completed without reloading any source data from off-chip memory. By loading the modules and the source data a single time from off-chip memory during the bootup operations, the latency of the bootup operation reduces.

Figure 6:
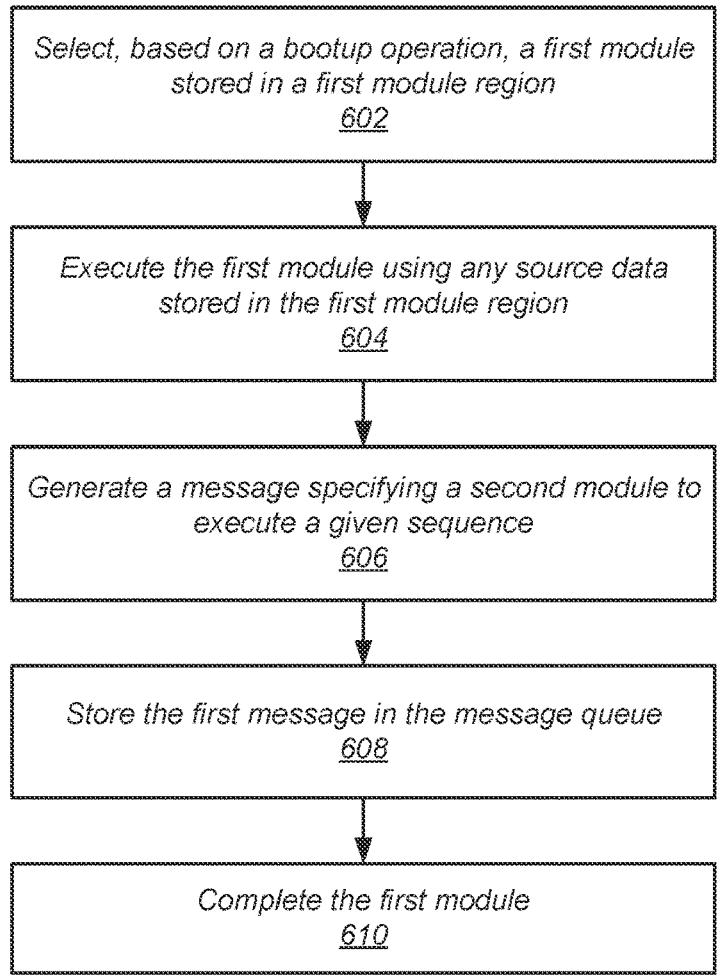
FIG. 6 is a generalized diagram of a method for efficiently performing a bootup operation.

Referring now to FIG. 6, generalized diagram is shown of a method 600 for efficiently performing a bootup operation. While executing a boot loader, a security processor allocates multiple memory regions in on-chip memory with each memory region to be used by a corresponding one of the multiple modules of the bootup operation. In an implementation, the security processor performs the many steps described in method 500 (of FIG. 5). The security processor selects, based on the boot loader, a first module stored in a first module region (block 602).

The security processor executes the first module using any source data stored in the first module region (block 604). A transfer of control occurs between supervisor mode and user mode of the computing system while the modules of the bootup operation are processed. While executing the first module, the security processor generates a message specifying a second module to execute a given sequence of instructions (block 606). In some implementations, the message also includes state information that indicates in what manner the second module is executed. For example, the code of the second module includes a case statement or an IF-THEN-ELSE construct, and a particular path taken in the second module is based on the state information in the message. The security processor stores the message in the message queue of the on-chip memory (block 608). In an implementation, the security processor authenticates the message before storing the message in the message queue of the on-chip memory. The security processor continues to execute the instructions of the first module until the first module completes (block 610). Afterward, in various implementations, the security processor selects another module to process.

Figure 7:
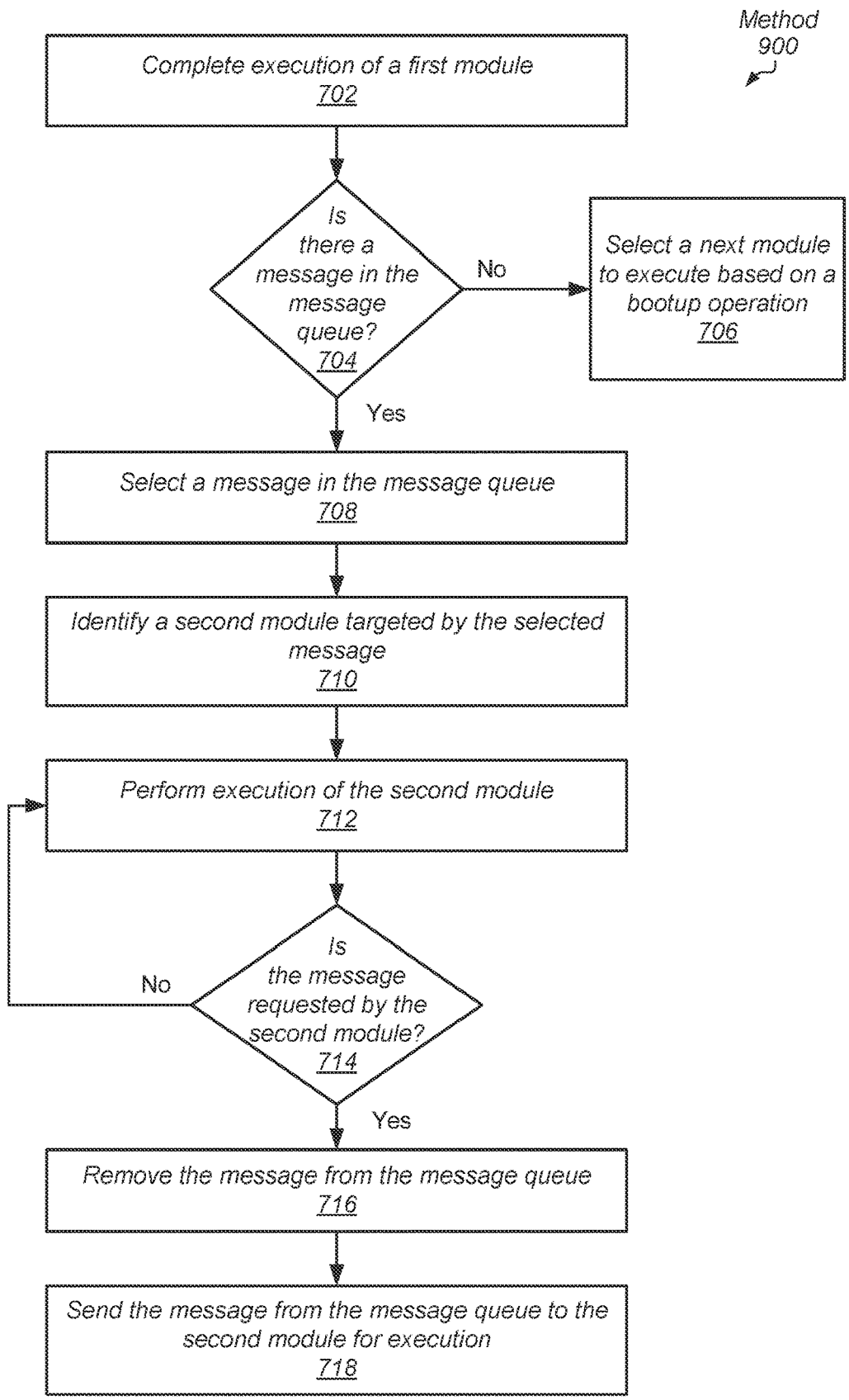
FIG. 7 is a generalized diagram of a method for efficiently performing a bootup operation.

Turning now to FIG. 7, generalized diagram is shown of a method 700 for efficiently performing a bootup operation. In various implementations, as described earlier, a security processor executes a bootup operation by transferring control between supervisor mode and user mode of the computing system. The security processor, in user mode, completes execution of a first module (block 702). In various implementations, the security processor checks the message queue upon completion of any module of the bootup operation. If the security processor determines that there is no message stored in the message queue ("no" branch of the conditional block 704), then the security processor selects a next module to execute based on a sequence defined by the boot loader of the bootup operation (block 706).

If, however, the security processor determines that there is a message stored in the message queue ("yes" branch of the conditional block 704), then the security processor selects a message in the message queue (block 708). In various implementations, the security processor manages the message queue as a first-in-first-out (FIFO) buffer in the on-chip memory. The message includes information such as an identifier of a second module that can generate the requested data, and state information that indicates in what manner the second module is executed. As described earlier, the state information determines which control flow paths are taken in the second module. Using the information stored in the selected message, the security processor identifies a second module targeted by the selected message (block 710).

The security processor performs execution of the second module (block 712). In some implementations, the second module includes a sequence of instructions before branching to different control flow paths can occur. Therefore, the second module does not yet need state information from the message. When the second module reaches a divergent point in its control flow, the second module being aware of the message, requests that the message be sent. In other implementations, the second module receives the message upon beginning execution. Other mechanisms for transferring state information and any other information from the message to the second module are also possible and contemplated.

In an implementation, the first above mechanism is used to transfer information from the message to the second module. While executing the second module, if the security processor determines the message is not yet requested by the given module ("no" branch of the conditional block 714), then control flow of method 700 returns to block 712 where the security processor continues to execute the given module. If, however, the security processor determines the message is requested by the given module ("yes" branch of the conditional block 714), then the security processor removes the message from the message queue (block 716). In other words, the message is de-allocated from the message queue, and the security processor sends required information in the message to the second module for execution (block 718).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
a first memory; and
an integrated circuit comprising circuitry configured to:
   load a first plurality of boot modules from a second memory into the first memory; and
   responsive to completing execution of a first boot module of the first plurality of boot modules, execute a second boot module of the first plurality of boot modules, wherein the second boot module is identified based at least in part on whether a message queue is empty.

2. The computing system as recited in claim 1, wherein:
the first memory is on-chip memory of a security processor;
the second memory is off-chip memory with respect to the security processor; and
the circuitry is configured to execute instructions of a boot loader stored in the on-chip memory, wherein the boot loader schedules retrieval of boot modules from the off-chip memory.

3. The computing system as recited in claim 1, wherein the circuitry is further configured to limit access to a given region of the first memory to a particular boot module of the first plurality of boot modules assigned to the given region.

4. The computing system as recited in claim 1, wherein the circuitry is further configured to inspect the message queue for messages, responsive to a boot module of the first plurality of boot modules completing execution.

5. The computing system as recited in claim 1, wherein the first boot module is configured to store the message in the message queue.

6. The computing system as recited in claim 1, wherein during execution of the second boot module of the first plurality of boot modules, the circuitry is further configured to store a second message in the message queue that identifies the first boot module as a next boot module to execute.

7. The computing system as recited in claim 1, wherein the second boot module is identified based on:
a message in the message queue, responsive to the message queue not being empty; or a bootup operation sequence, responsive to the message queue being empty.

8. A method comprising:

loading, by circuitry of a processor, a first plurality of boot modules from off-chip memory into an on-chip memory of the processor; and responsive to completing execution of a first boot module of the first plurality of boot modules, executing a second boot module of the first plurality of boot modules, wherein the second boot module is identified based at least in part on whether a message queue is empty.

9. The method as recited in claim 8, further comprising initializing, by the circuitry, the message queue in the on-chip memory, where each of a plurality of entries of the message queue is configured to store an indication of a message.

10. The method as recited in claim 8, further comprising inspecting, by the circuitry, the message queue for messages, in response to a module of the first plurality of boot modules completing execution.

11. The method as recited in claim 8, further comprising storing, by the first boot module, the message in the message queue.

12. The method as recited in claim 8, wherein during execution of the second boot module of the first plurality of boot modules, the method further comprises storing a message in the message queue that identifies the first boot module as a next boot module to execute.

13. The method as recited in claim 8, further comprising loading, by the circuitry, a second plurality of boot modules from off-chip memory into the on-chip memory, in response to:

each of the first plurality of boot modules having completed execution; and the message queue being empty.

14. The method as recited in claim 8, wherein the second boot module is identified based on:

a message in the message queue, responsive to the message queue not being empty; or a bootup operation sequence, responsive to the message queue being empty.

15. An integrated circuit comprising:

a processor comprising circuitry configured to:

load a first plurality of boot modules from an off-chip memory into an on-chip memory of the processor;

responsive to completing execution of a first boot module of the first plurality of boot modules, execute a second boot module of the first plurality of boot modules, wherein the second boot module is identified based at least in part on whether a message queue is empty.

16. The integrated circuit as recited in claim 15, wherein the circuitry is further configured to inspect the message queue for messages, in response to a module of the first plurality of boot modules having completed execution.

17. The integrated circuit as recited in claim 15, wherein the message is stored in the message queue by the first boot module.

18. The integrated circuit as recited in claim 15, wherein the second boot module is configured to store a message in the message queue that identifies the first boot module as a next boot module to execute.

19. The integrated circuit as recited in claim 15, wherein the circuitry is further configured to limit access to a given region of the on-chip memory to a particular boot module of the first plurality of boot modules assigned to the given region.

20. The integrated circuit as recited in claim 15, wherein the second boot module is identified based on:

a message in the message queue, responsive to the message queue not being empty; or a bootup operation sequence, responsive to the message queue being empty.

* * * * *